US009753176B2

(12) United States Patent
Datey et al.

(10) Patent No.: US 9,753,176 B2
(45) Date of Patent: Sep. 5, 2017

(54) ESTIMATING ADSORBED GAS VOLUME FROM NMR AND DIELECTRIC LOGS

(71) Applicant: Schlumberger Technology Corporation, Sugar Land, TX (US)

(72) Inventors: Ashish Datey, Camberwell (AU); Timothy Andrew John Hopper, Subiaco (AU); Lalitha Venkataramanan, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 738 days.

(21) Appl. No.: 13/767,721

(22) Filed: Feb. 14, 2013

(65) Prior Publication Data

US 2014/0229112 A1 Aug. 14, 2014

(51) Int. Cl.
*G01V 1/40* (2006.01)
*G01V 3/32* (2006.01)
(Continued)

(52) U.S. Cl.
CPC ................ *G01V 3/32* (2013.01); *E21B 47/00* (2013.01); *G01V 3/26* (2013.01)

(58) Field of Classification Search
CPC ... G01V 1/30; G01V 1/48; G01V 1/50; G01V 3/28; G01V 3/38; G01V 5/101;
(Continued)

(56) References Cited

U.S. PATENT DOCUMENTS 5,629,623 A 5/1997 Sezginer et al.
6,032,101 A 2/2000 Freedman et al.
(Continued)

OTHER PUBLICATIONS

Yuesheng Cheng, Abdel M. Kharrat, Schlumberger-DBR, Edmonton AB; Rob Badry, Schlumberger of Canada, Calgary AB; Robert L. Kleinberg, Schlumberger-Doll Research, Cambridge MA, "Power-law Relationship Between the Viscosity of Heavy Oils and NMR Relaxation," SPWLA 50th Annual Logging Symposium, Jun. 21-24, 2009 , The Woodlands, Texas, 2009, pp. 1-7.
(Continued)

*Primary Examiner* — Aditya Bhat
(74) *Attorney, Agent, or Firm* — Michael Dae

(57) ABSTRACT

Adsorbed gas in a formation may be estimated. Nuclear magnetic resonance (NMR) data for a subsurface geological formation is obtained, and at least a portion of the NMR data is corrected to produce corrected NMR data. A NMR-based estimate of formation porosity is determined using the corrected NMR data. Dielectric permittivity data for the subsurface geological formation is obtained, and a dielectric permittivity-based estimate of the formation water-filled porosity is determined using the dielectric permittivity data. A gas volume is determined using the determined NMR-based estimate of the formation porosity and the determined dielectric permittivity-based estimate of the formation water-filled porosity. The gas volume may be determined by subtracting the determined dielectric permittivity-based estimate of the formation water-filled porosity from the determined NMR-based estimate of the formation porosity. The gas volume per unit volume of the formation may be determined using an equation of state.

10 Claims, 10 Drawing Sheets

100 Computing system
101A
102 Analysis Module(s)
104 Processor(s)
106 Storage Media
108 Network Interface
110
Computer System 101B
Computer System 101C
Computer System 101D

(51) Int. Cl.
*E21B 47/00* (2012.01)
*G01V 3/26* (2006.01)

(58) Field of Classification Search
CPC ........ G01V 5/104; G01V 5/107; G01V 11/00; E21B 43/00; E21B 47/022; E21B 49/00; E21B 49/008
USPC .............................................. 702/6–8, 11–13
See application file for complete search history.

(56) References Cited

U.S. PATENT DOCUMENTS

| | | | | |
|---|---|---|---|---|
| 6,069,477 | A | 5/2000 | Chen et al. | |
| 6,389,360 | B1 | 5/2002 | Alft et al. | |
| 6,445,187 | B1 * | 9/2002 | Montgomery | G01R 33/02 324/244 |
| 7,075,297 | B2 | 7/2006 | Freedman | |
| 2006/0290350 | A1 | 12/2006 | Hursan et al. | |
| 2007/0244648 | A1 * | 10/2007 | Chen | G01N 24/081 702/11 |
| 2010/0109664 | A1 * | 5/2010 | Minh | G01V 3/32 324/303 |
| 2010/0161227 | A1 * | 6/2010 | Deere | G01V 11/00 702/9 |
| 2012/0192640 | A1 * | 8/2012 | Minh | E21B 7/06 73/152.16 |
| 2012/0232859 | A1 * | 9/2012 | Pomerantz | G01V 99/005 703/2 |
| 2012/0296617 | A1 * | 11/2012 | Zuo | E21B 47/10 703/10 |

OTHER PUBLICATIONS

Peter Hook, SPE, David Fairhurst, SPE, Erik Rylander, Rob Badry, SPE, Nate Bachman, SPE, Steve Crary, SPE, Schlumberger Oilfield Services; and Kirk Chatawanich, Tim Taylor, Texas American Resource Company, "Improved Precision Magnetic Resonance Acquisition: Application to Shale Evaluation," SPE Annual Technical Conference and Exhibition, Oct. 30-Nov. 2, 2011, Denver, Colorado, USA, SPE 146883, 2011, pp. 1-8.

Ravinath Kausik, Chanh Cao Minh, Lukasz Zielinski, Badarinadh Vissapragada, Ridvan Akkurt, Yiqiao Song, Schlumberger; Chengbing Liu, Sid Jones, Erika Blair, Chevron, "Characterization of Gas Dynamics in Kerogen Nanopores by NMR," SPE Annual Technical Conference and Exhibition, Oct. 30-Nov. 2, 2011, Denver, Colorado, USA, SPE 147198, 2011, pp. 1-16.

C.H. Sondergeld, SPE, University of Oklahoma; R.J. Ambrose, SPE, Devon Energy; and C.S. Rai, SPE, and J. Moncrieff, SPE, University of Oklahoma, "Micro-Structural Studies of Gas Shales," SPE Unconventional Gas Conference, Feb. 23-25, 2010, Pittsburgh, Pennsylvania, USA, SPE 131771, 2010, pp. 1-17.

L. Venkataramanan, Schlumberger-Doll Res., Ridgefield, CT; Song Yi-Qiao; and M.D. Hurlimann, "Solving Fredholm integrals of the first kind with tensor product structure in 2 and 2.5 dimensions," IEEE Transactions on Signal Processing, vol. 50, No. 5, May 2002, pp. 1017-1026.

U.S. Appl. No. 61/657,527, filed Jun. 8, 2012.

U.S. Appl. No. 13/346,468, filed Jan. 9, 2012.

International Search Report and Written Opinion issued in PCT/US2014/016167 on Jul. 18, 2014, 16 pages.

* cited by examiner

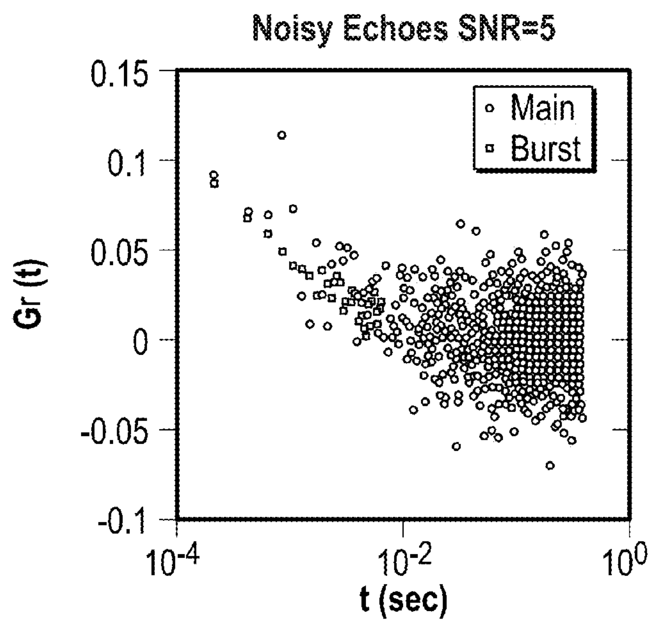
FIG. 6
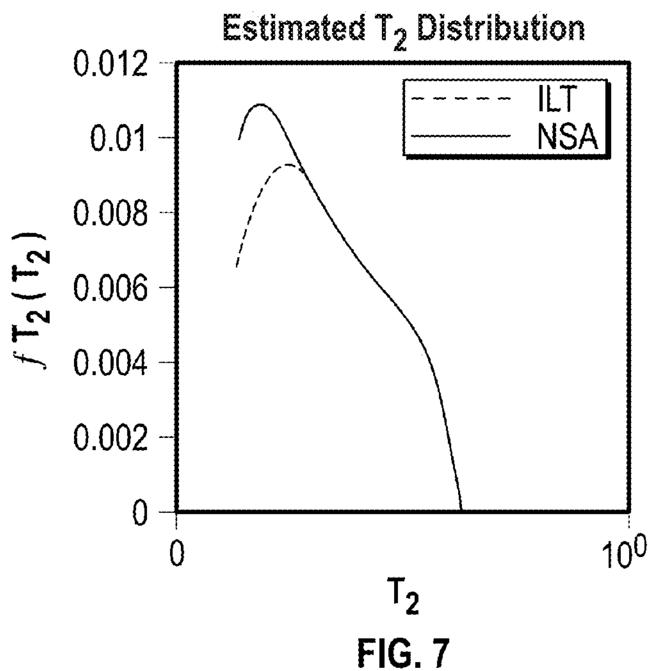
FIG. 7
Porosity:
$\phi_{true}$=11.0 pu
$\hat{\phi}$=10.1± 0.7 pu
$\tilde{\phi}_c$=10.1±0.8 pu
T2LM (in ms):
$T_{2, LM, true}$ = 1.66
$\hat{T}_{2, LM}$ = 2.19
$\tilde{T}_{2, LM,c}$ = 1.91
FIG. 8

ESTIMATING ADSORBED GAS VOLUME FROM NMR AND DIELECTRIC LOGS

BACKGROUND OF THE DISCLOSURE

Nuclear Magnetic Resonance (NMR) tools used for well-logging or downhole fluid characterization measure the response of nuclear spins in formation fluids to applied magnetic fields. Downhole NMR tools typically have a permanent magnet that produces a static magnetic field at a desired test location (e.g., where the fluid is located). The static magnetic field produces a magnetization in the fluid. The magnetization is aligned along the direction of the static field. The magnitude of the induced magnetization is proportional to the magnitude of the static field. A transmitter antenna produces a time-dependent radio frequency magnetic field that has a component perpendicular to the direction of the static field. The NMR resonance condition is satisfied when the radio frequency is equal to the Larmor frequency, which is proportional to the magnitude of the static magnetic field. The radio frequency magnetic field produces a torque on the magnetization vector that causes it to rotate about the axis of the applied radio frequency field. The rotation results in the magnetization vector developing a component perpendicular to the direction of the static magnetic field. This causes the magnetization vector to precess around the static field at the Larmor frequency. At resonance between the Larmor and transmitter frequencies, the magnetization is tipped to the transverse plane (i.e., a plane normal to static magnetic field vector). A series of radio frequency pulses are applied to generate spin echoes that are measured with the antenna.

NMR measurements can be used to estimate, among other things, formation porosity. For example, the area under the curve of a T2 distribution for a NMR measurement can be equated to or at least provides an estimate of the NMR-based porosity. The T2 distribution may also resemble the pore size distribution in water-saturated rocks. The raw reported porosity is provided by the ratio of the initial amplitude of the raw decay and the tool response in a water tank. This porosity is independent of the lithology of the rock matrix.

Another tool used to estimate formation porosity, among other things, is a dielectric permittivity tool (also known as a dielectric constant tool). A dielectric permittivity tool measures the dielectric permittivity of a material. The dielectric permittivity is related to the ability of electric dipoles in a material to form and align themselves with an alternating electric field. Water molecules have large dipole moments and consequently the dielectric permittivity of water is high. It is precisely this high dielectric permittivity, particularly as compared to oil, gas, and typical rock matrices encountered in hydrocarbon exploration, that dielectric measurements often seek to exploit. Dielectric permittivity tools generally operate at high frequencies (e.g., gigahertz), at least as compared to conventional electromagnetic resistivity tools.

Estimation of adsorbed gas volume in Coal Seam Gas (CSG) or Coal Bed Methane (CBM) in a timely manner remains a challenge for operators. The most common current technique is to collect core samples from a borehole. The freshly cut cores are sealed in airtight desorption canisters and the volume of gas that desorbs over time is measured. The measured desorbed gas volume generally underestimates the correct gas volume due to lost gas, i.e., the gas that desorbs before the cores can be placed in the airtight desorption canisters. Correction for lost gas may be estimated, but this method yields widely different in-situ gas volume estimates depending upon the coal sample type, collection methodology, analysis conditions, and data analysis methods. The method may also take up to six months to yield results, the long period being required for better measurement accuracy.

SUMMARY

Adsorbed gas in a formation may be estimated. Nuclear magnetic resonance (NMR) data for a subsurface geological formation is obtained, and at least a portion of the NMR data is corrected to produce corrected NMR data. A NMR-based estimate of formation porosity is determined using the corrected NMR data. Dielectric permittivity data for the subsurface geological formation is obtained, and a dielectric permittivity-based estimate of the formation water-filled porosity is determined using the dielectric permittivity data. A gas volume is determined using the determined NMR-based estimate of the formation porosity and the determined dielectric permittivity-based estimate of the formation water-filled porosity. The gas volume may be determined by subtracting the determined dielectric permittivity-based estimate of the formation water-filled porosity from the determined NMR-based estimate of the formation porosity. The gas volume per unit volume of the formation may be determined using an equation of state.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments of estimating adsorbed gas volume from NMR and dielectric logs are described with reference to the following figures. The same numbers are generally used throughout the figures to reference like features and components.

FIG. 6 is a plot of simulated main and burst data with additive noise and a SNR equal to five, in accordance with the present disclosure.

FIG. 7 shows two estimated $T_2$ distributions, one produced from an Inverse Laplace Transform and another produced by applying a correction factor in accordance with the present disclosure.

FIG. 8 lists the true and estimated values of porosity, logarithmic mean $T_2$ (T2LM) and bound fluid volume (BFV)

from the uncorrected (ILT) and corrected $T_2$ distributions, in accordance with the present disclosure.

Figure 9:
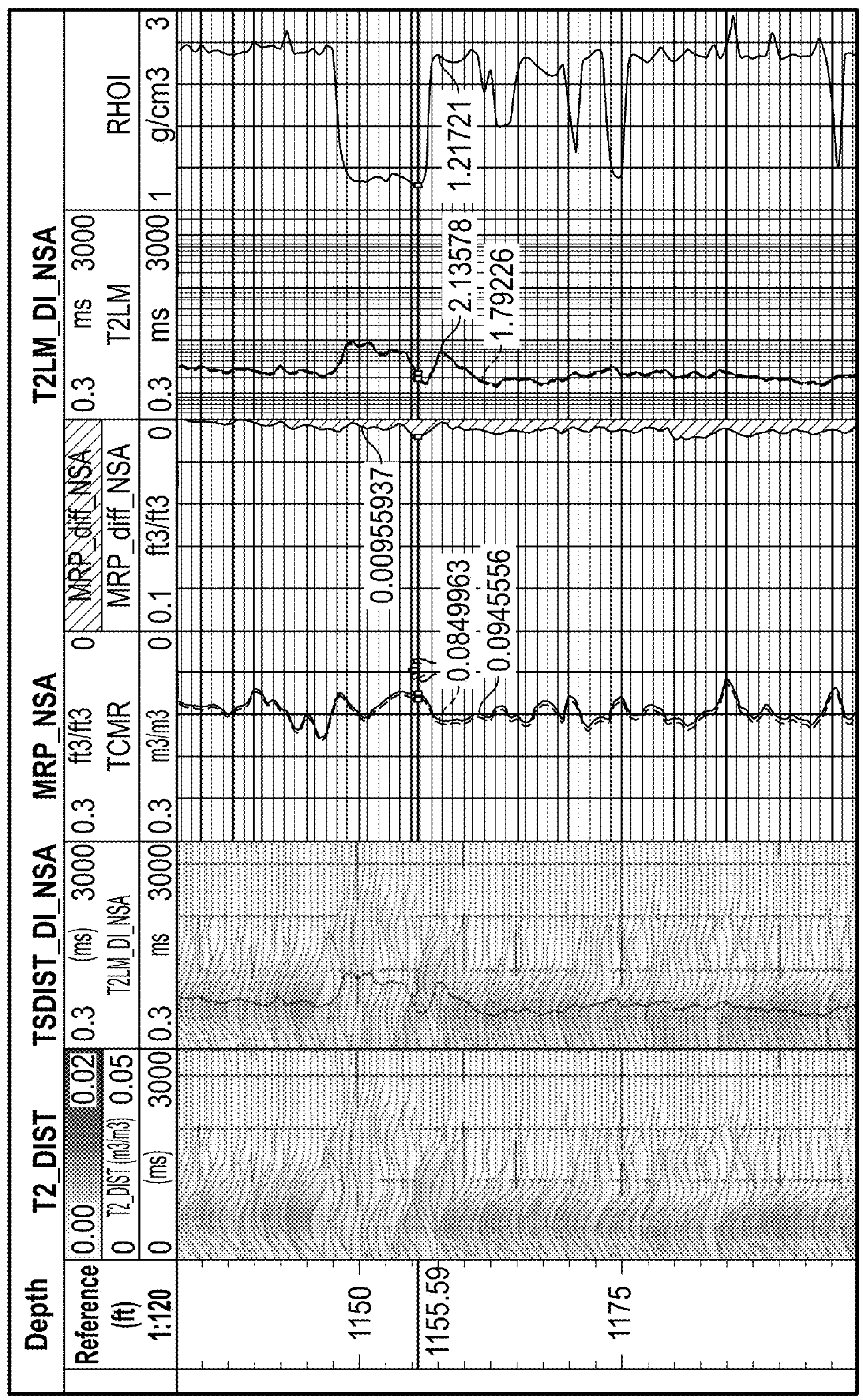

FIG. 9 is a log showing various measured and computed quantities from a first data set, in accordance with the present disclosure.

Figure 10:
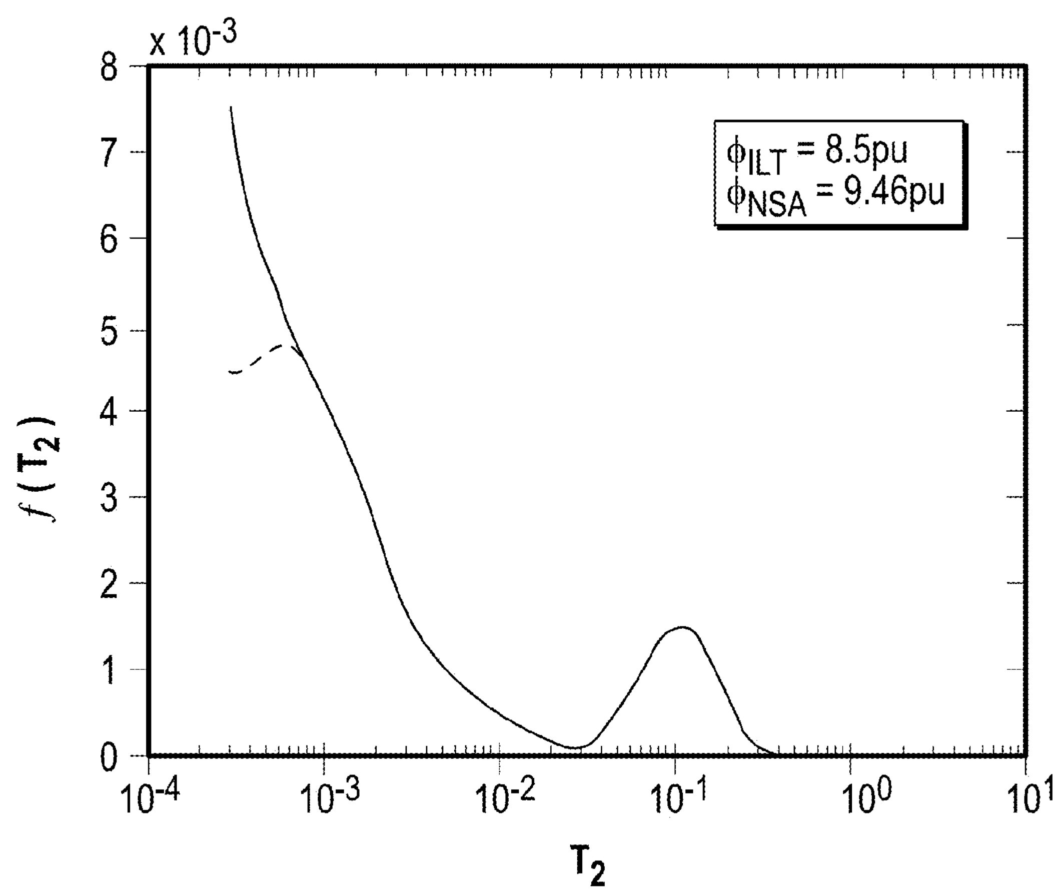

FIG. 10 is a plot of two NMR signals from FIG. 9 as functions of T2 relaxation times, one uncorrected (ILT) and the other corrected (NSA), in accordance with the present disclosure.

Figure 11:
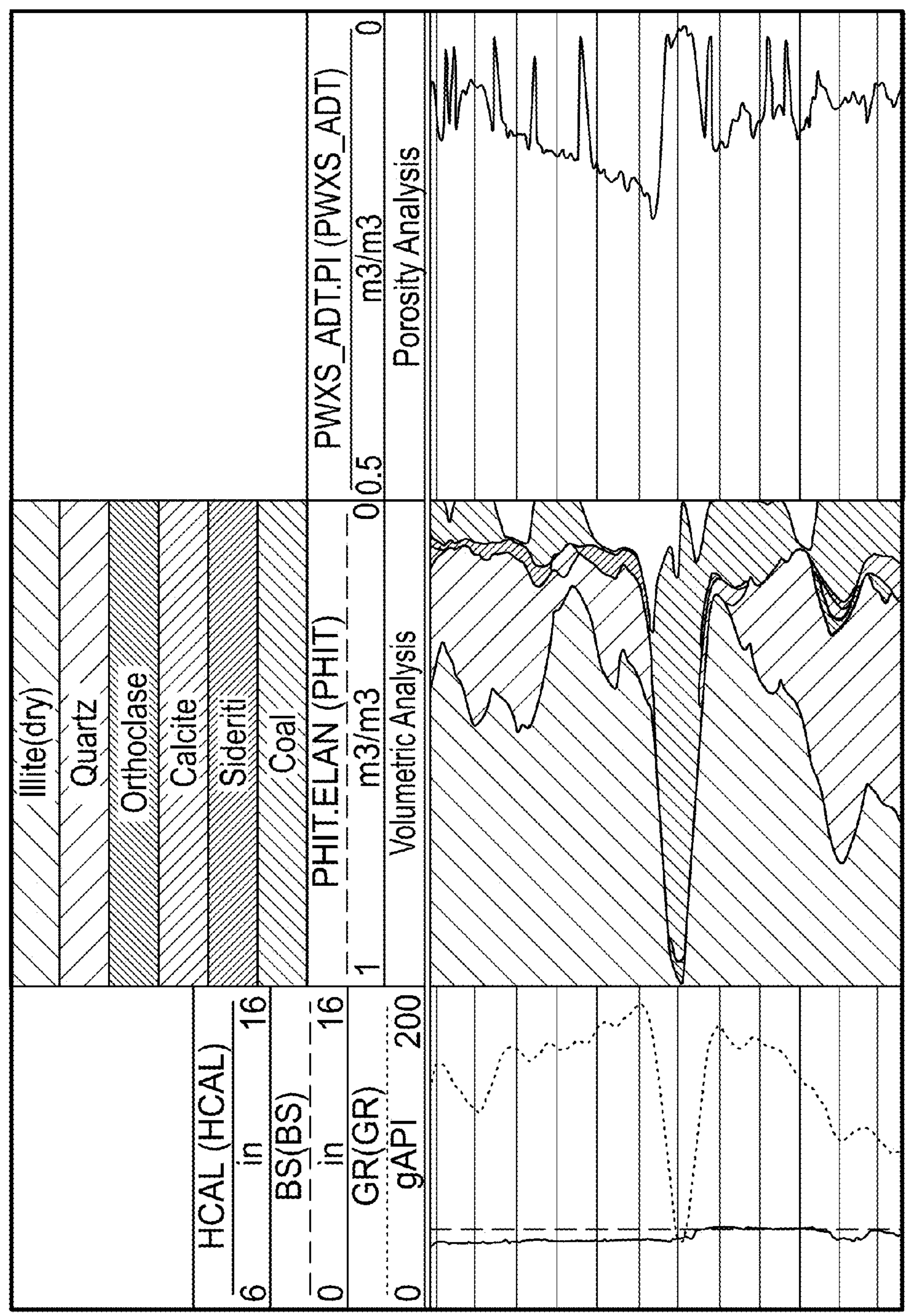

FIG. 11 is log showing various measured and computed quantities from a second data set, and shows a water-filled porosity (far right track–PWXS_ADT.PI) in a coal seam determined from a dielectric measurement.

Figure 12:
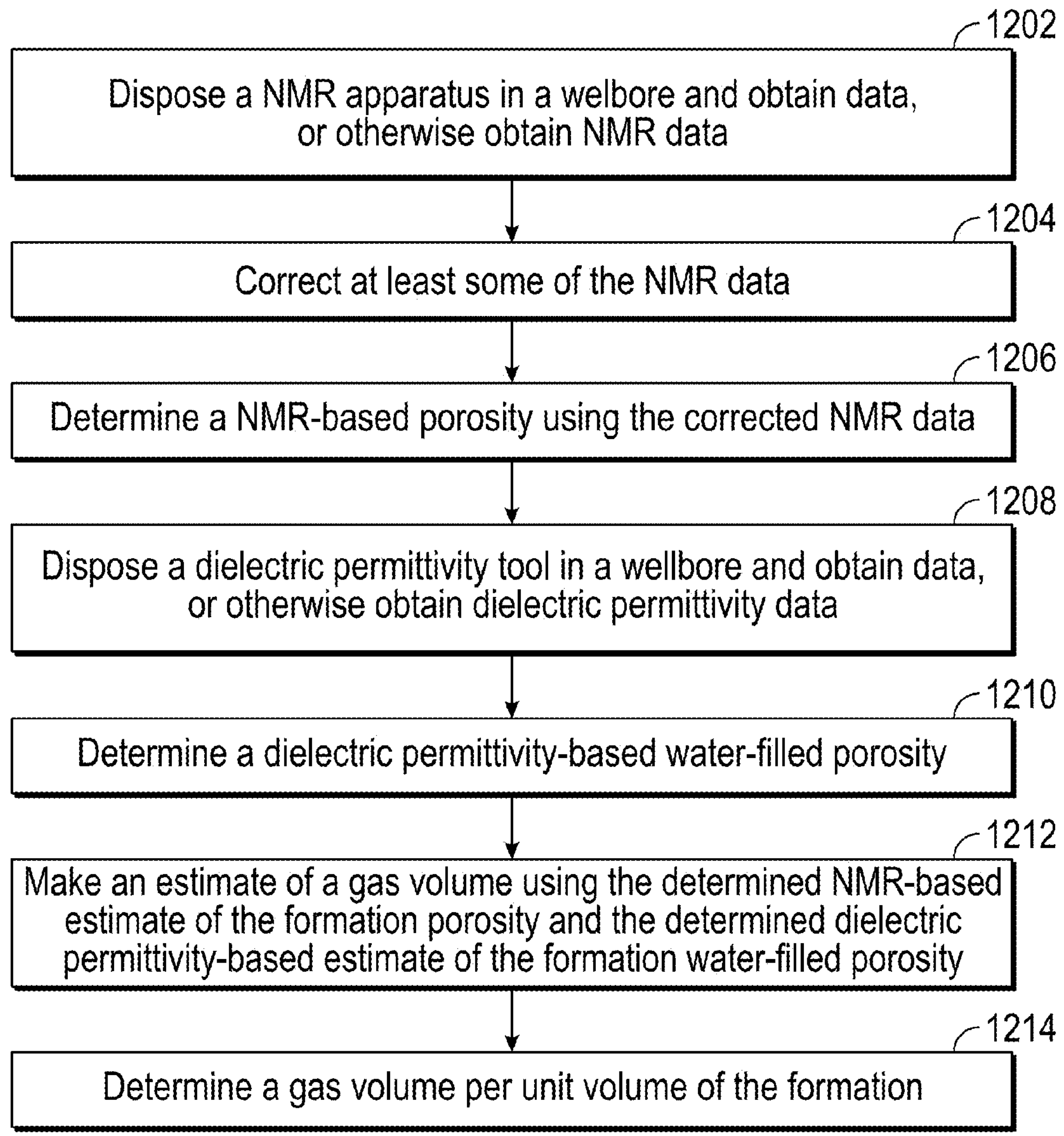

FIG. 12 is a flowchart showing possible steps for one or more embodiments, in accordance with the present disclosure.

Figure 13:
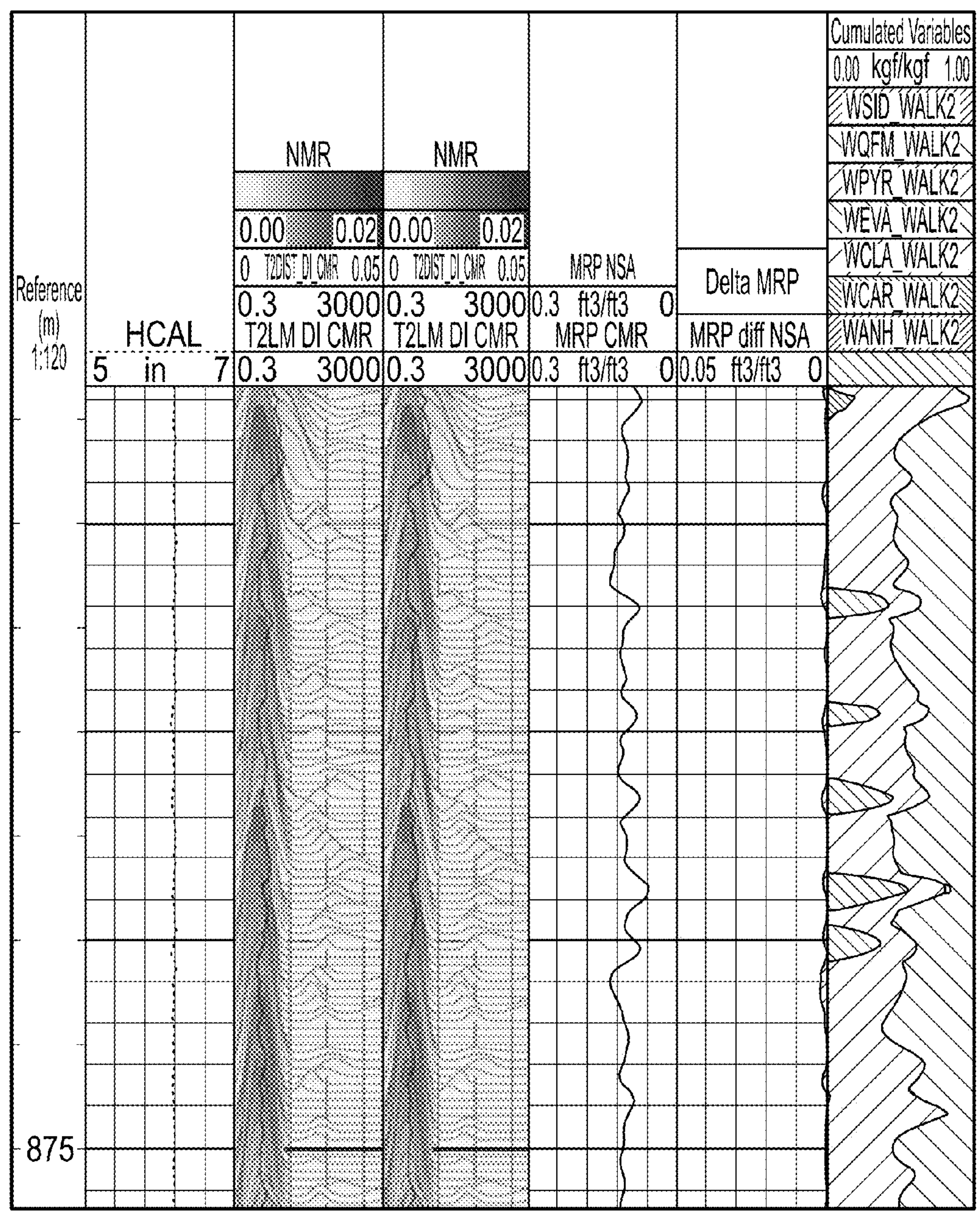

FIG. 13 is a log showing various measured and computed quantities from a third data set, in accordance with the present disclosure.

Figure 14:
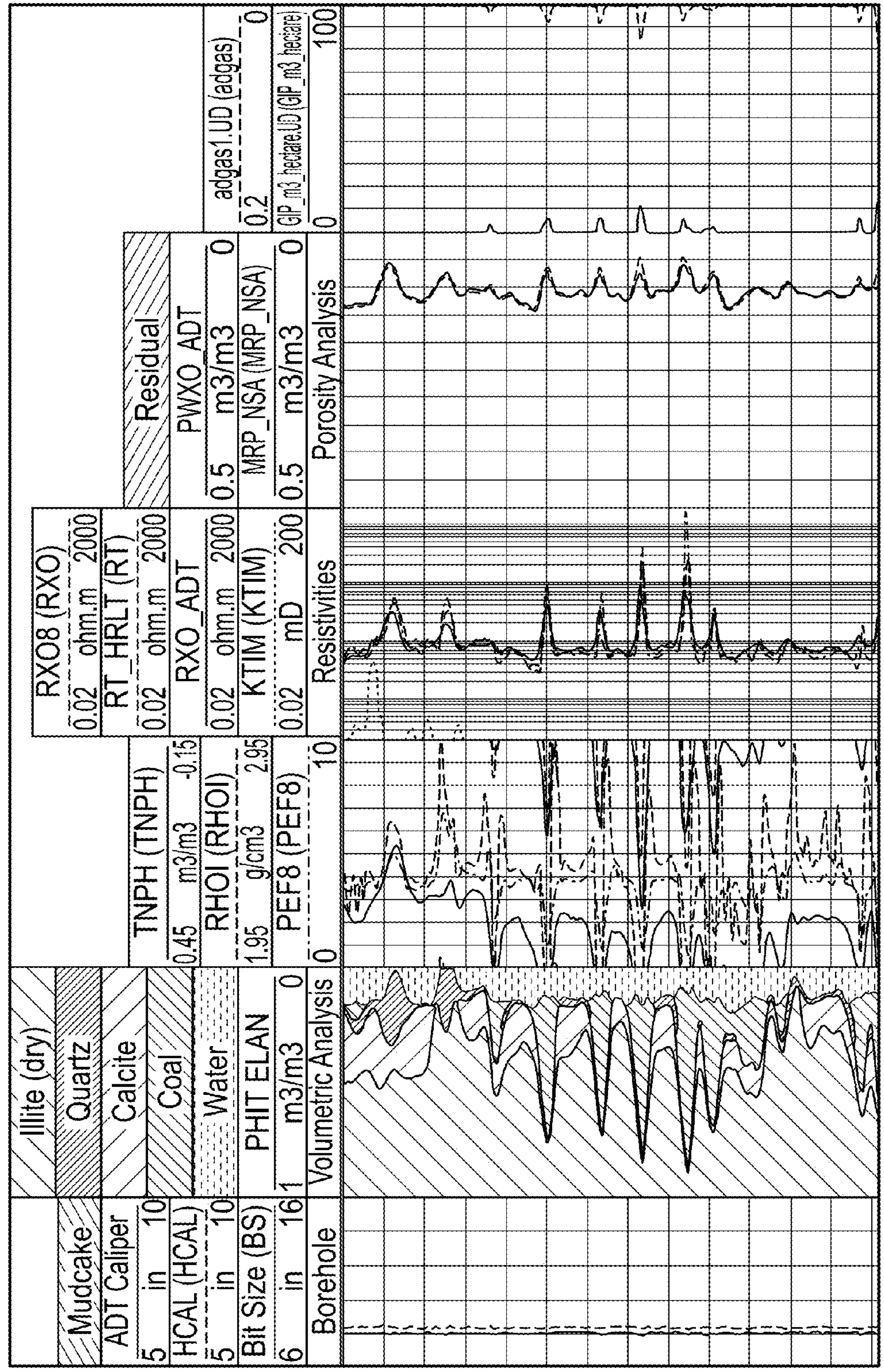

FIG. 14 is a log showing various measured and computed quantities from a fourth data set, in accordance with the present disclosure.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
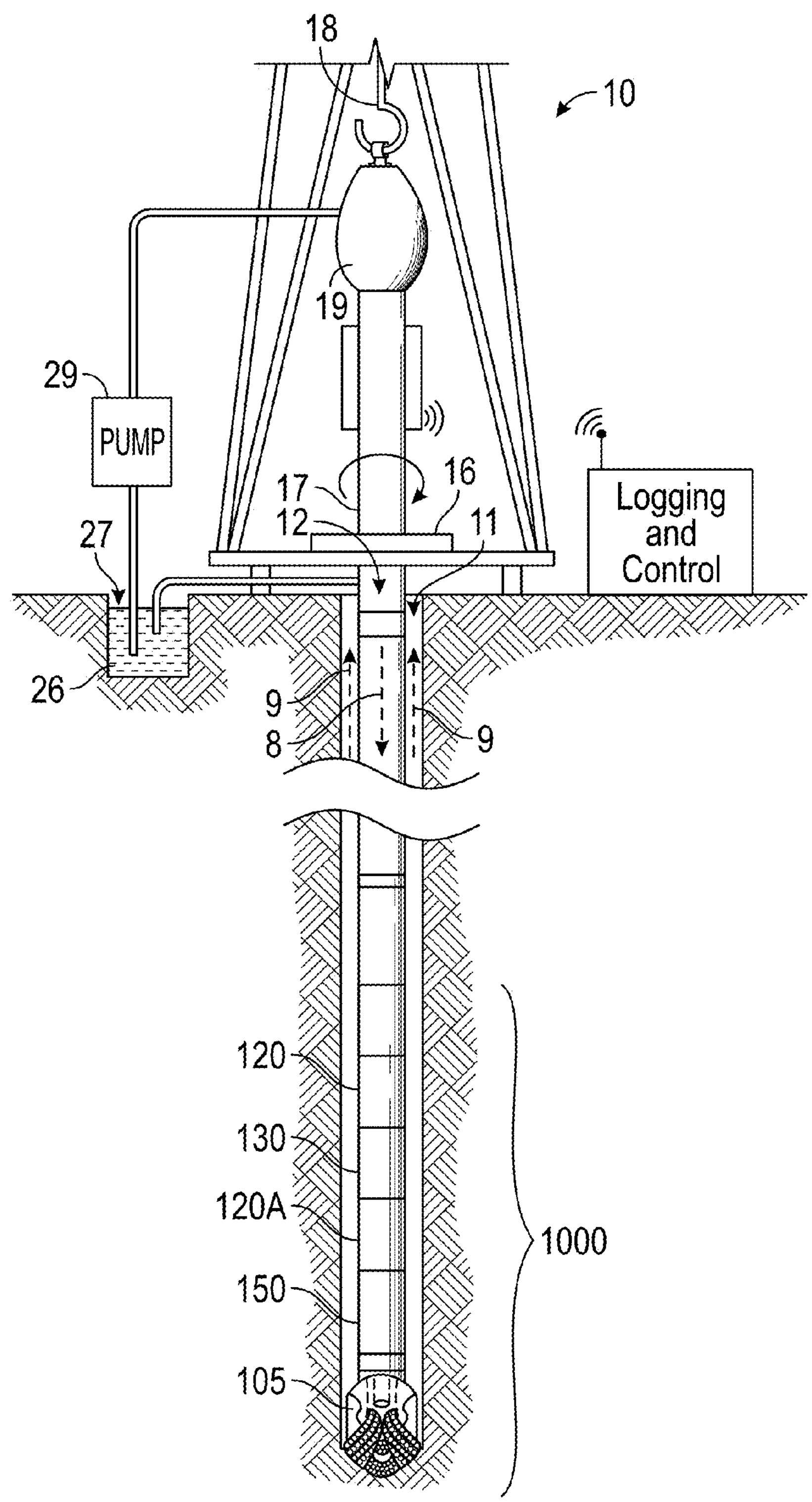
FIG. 1 illustrates an exemplary, prior art well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 1000 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

The bottom hole assembly 1000 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g., as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a NMR measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
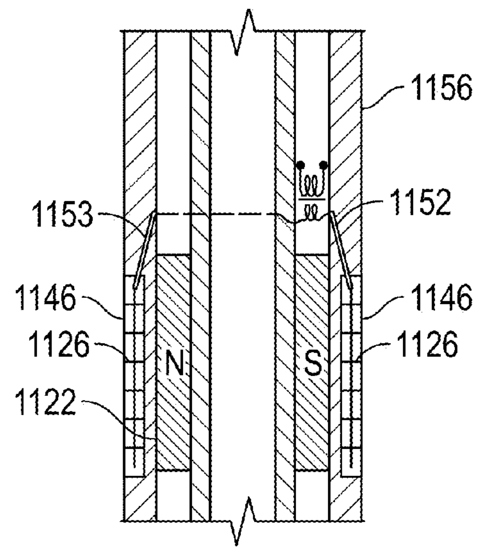
FIG. 2 shows a prior art nuclear magnetic resonance logging tool.

FIG. 2 shows an embodiment of a type of device described in U.S. Pat. No. 5,629,623 for formation evaluation while drilling using pulsed nuclear magnetic resonance (NMR), incorporated herein by reference, it being understood that other types of NMR/LWD tools can also be utilized as the LWD tool 120 or part of an LWD tool suite 120A. As described in the '623 Patent, an embodiment of one configuration of the device comprises a modified drill collar having an axial groove or slot that is filled with a ceramic insulator, and contains RF antenna 1126, which is protected by a non-magnetic cover 1146 and produces and receives pulsed RF electromagnetic energy. In the embodiment shown, the conductors of the RF antenna are grounded at one end to the drill collar. At the other end, the conductors are coupled to an RF transformer 1156 via pressure feed-throughs 1152 and 1153. A cylindrical magnet 1122 produces a static magnetic field in the formations. The RF antenna can also be arranged so that the drill collar itself produces the oscillating RF magnetic field. The oscillating RF magnetic field, which excites nuclei of substances in the formations, is axially symmetric, to facilitate measurements during rotation of the drill string.

Recent electromagnetic (EM) logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. A triaxial antenna is one in which three antennas (i.e., antenna coils) are arranged to be mutually orthogonal. Typically, one antenna (coil) is axial and the other two are transverse. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to estimate adsorbed gas volume from NMR and dielectric logs are disclosed. The disclosed system and method may be used in conjunction with a computing system as described below.

Figure 3:
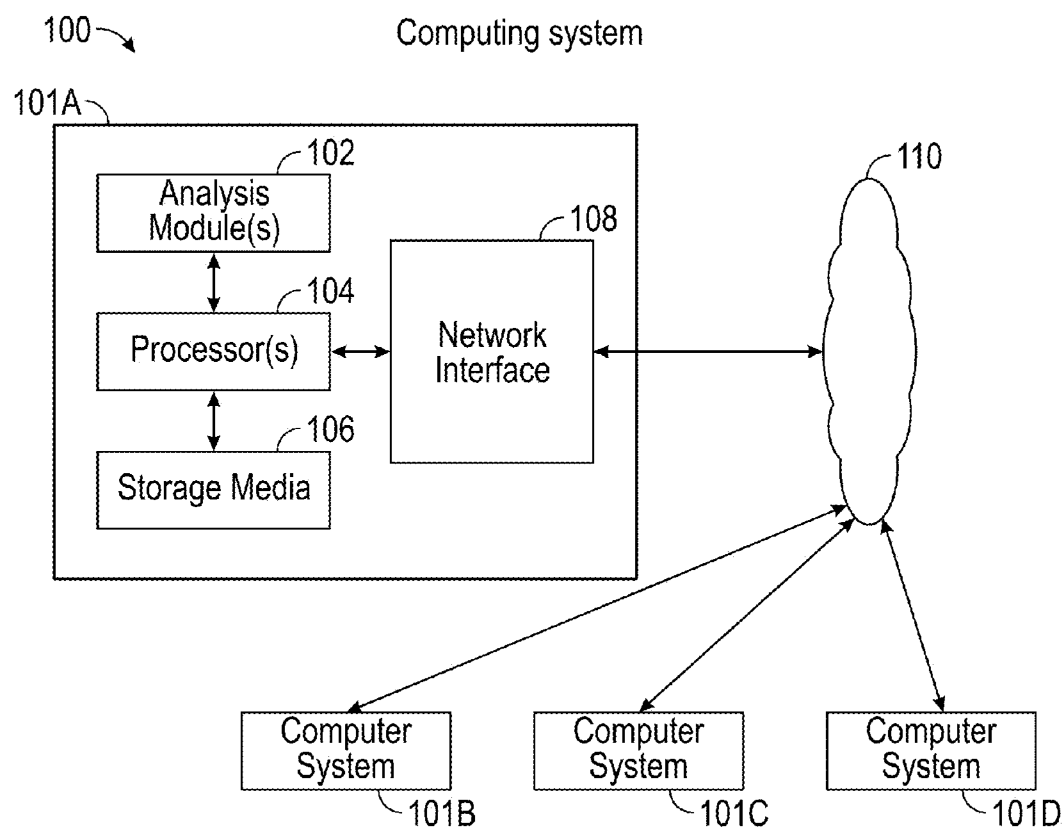
FIG. 3 illustrates an example computing system usable for one or more disclosed embodiments, in accordance with the present disclosure.

The computing system 100 shown in FIG. 3 can be an individual computer system 101A or an arrangement of distributed computer systems. The computer system 101A includes one or more analysis modules 102 that are configured to perform various tasks according to some embodiments, such as one or more methods disclosed herein (e.g., any of the steps, methods, techniques, and/or processes, and/or combinations and/or variations and/or equivalents thereof). To perform those various tasks, analysis module 102 operates independently or in coordination with one or more processors 104 that is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C, and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers onshore, on other ships, and/or located in various countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 3 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 3, and/or computing system 100 may have a different configuration or arrangement of the components depicted in FIG. 3. For example, though not shown explicitly, computing system 100 would generally include input and output devices such as a keyboard, a mouse, a display monitor, and a printer and/or plotter. The various components shown in FIG. 3 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of this disclosure.

Attention is now directed to processing procedures, methods, techniques, and workflows that are in accordance with some embodiments. Some operations in the processing procedures, methods, techniques, and workflows disclosed herein may be combined and/or the order of some operations may be changed. It is important to recognize that geologic interpretations, sets of assumptions, and/or domain models such as velocity models may be refined in an iterative fashion. This concept is applicable to the processing procedures, methods, techniques, and workflows discussed herein. This iterative refinement can include use of feedback loops executed on an algorithmic basis, such as at a computing device (e.g., computing system 100, FIG. 3), and/or through manual control by a user who may make determinations regarding whether a given step, action, template, or model has become sufficiently accurate for the evaluation of the subsurface three-dimensional geologic formation under consideration.

To more accurately estimate a parameter such as porosity from measured NMR data for a set of acquisition and inversion parameters, a sensitivity curve for the parameter may be characterized and the curve used to modify the sensitivity such that the resulting parameter is more accurate over the entire range of the measured relaxation domain. This may be used to more accurately estimate petrophysical or fluid parameters such as porosity, logarithmic-mean-relaxation times, a logarithmic mean-diffusion coefficient, bound and free fluid volumes, fluid saturations, wettability, permeability, and fluid viscosity. Further, this may also be applied to magnetization data from multiple dimensions such as longitudinal relaxation time T1, transverse relaxation time T2, and diffusion coefficient D. In this case, the sensitivity curve of a parameter can be characterized with respect to multiple NMR variables (T1, T2 and/or D) and used to modify the sensitivity of the petrophysical or fluid parameter such that the resulting parameter is more accurate in the specified range of the NMR variable. Examples of techniques that may be used to improve the accuracy of measured NMR data (such as NMR-based porosity measurements) are disclosed in commonly assigned U.S. Provisional Patent Application No. 61/657,527, filed Jun. 8, 2012, the disclosure of which is incorporated by reference herein in its entirety.

In subterranean applications of low-field nuclear magnetic resonance, measurement acquisition and analysis are normally optimized for data that have relaxation in the center of the $T_2$ relaxation spectrum, usually between 50 msec and 500 msec. There are numerous applications, however, in which the measured magnetization data have short relaxation components, on the order of a few milliseconds. Examples of those applications include heavy oils, hydrocarbons, water in small pores, and oil and gas shales. In those applications, traditional processing techniques often inaccurately predict the porosity and other parameters derived from NMR data.

A porosity sensitivity curve may be obtained as follows. For each location of the Dirac-delta function in the $T_2$ domain, magnetization data with porosity $\phi_T$ are simulated with additive white Gaussian noise with zero-mean and standard deviation $\sigma_\in$. The signal-to-noise ratio (SNR) for the data set is $$\frac{\phi_T}{\sigma_\varepsilon}.$$

The sensitivity curve can be computed a priori and is a function of the pulse sequence (such as a fully polarized Carr Purcell Meiboom Gill (CPMG), Enhanced Precision Mode (EPM)), data acquisition parameters (such as wait times, number of bursts, number of repeats, cable speed, and the SNR in the data), and inversion parameters (such as regularization, lower and upper limits of the discretized relaxation times, the level of discretization, and the $T_1/T_2$ ratio). The data are then analyzed using, for example, an Inverse Laplace Transform (ILT).

Let the estimated porosity from the inversion algorithm be $\hat{\phi}$. The normalized bias in porosity at a particular relaxation time $T_2$ is:

$$B = \frac{\langle\hat{\phi}\rangle - \phi_T}{\phi_T}.$$

Figure 4:
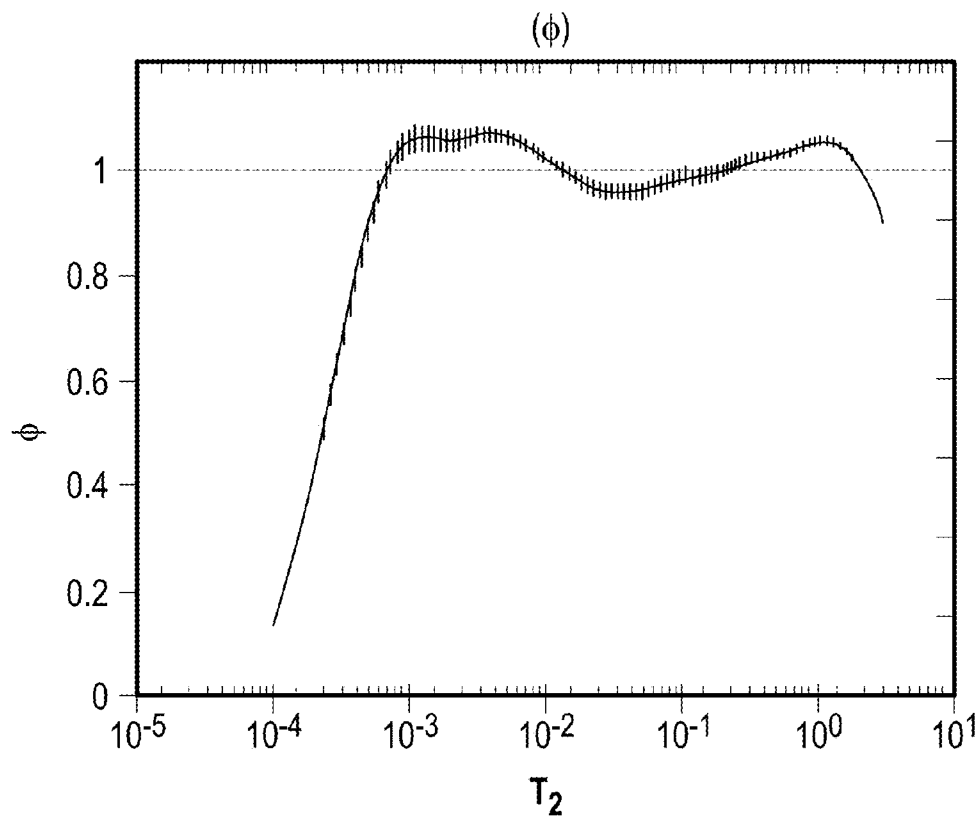
FIG. 4 is a porosity sensitivity plot, produced in accordance with the present disclosure.

The average <.> is computed over many different realizations of noise. (Note: bent brackets are used herein to denote an arithmetic average, and bent brackets enclosing a period are used herein as a shorthand notation to represent the understood referenced average.) For a given set of acquisition and inversion parameters, the normalized bias B can be computed from the mean of the porosity obtained from multiple realizations of the data as the location of the Dirac-delta function systematically scans the $T_2$ spectrum. Similarly, the standard deviation $\sigma_\phi$ (or error-bar) of the estimated porosity (as shown in FIG. 4) can also be computed a priori for each location of the Dirac-delta function. Together, the bias and the standard deviation can be used to compute a correction factor for the estimated $T_2$ distribution and porosity as follows.

Consider a measured magnetization decay, obtained and analyzed using the same acquisition and inversion parameters used to derive the porosity sensitivity curve. Let $\hat{\phi}(T_2)$ obtained from the non-linear analysis denote the 'binned porosity', referring to the estimated $T_2$ distribution for a specified relaxation time $T_2$. We equate the normalized error to the previously computed normalized bias:

$$B(T_2) \approx \frac{\hat{\phi}(T_2) - \phi_T}{\phi_T}.$$

The corrected porosity is:

$$\phi_c(T_2) \approx \phi_T = \frac{\hat{\phi}(T_2)}{1 + B(T_2)}.$$

To a first-order approximation, a correction factor $c_f(T_2)$ can be computed as:

$$c_f(T_2) = \frac{1}{1+B(T_2)}. \quad (1)$$

Therefore, a more accurate estimate of porosity at any relaxation time $T_2$ is:

$$\tilde{\phi}_c(T_2)=c_f(T_2)\hat{\phi}(T_2). \quad (2)$$

The role of the correction factor in eqn. (1) is to amplify the binned porosity where it tends to be under-estimated and reduce the porosity where it is over-estimated. That is, the correction factor provides a way to weight the NMR data. This results in a more uniform sensitivity and accurate estimate of the binned and total porosity over the range of the $T_2$ spectrum.

An alternate expression for the correction factor can be obtained by taking into account the SNR of the $T_2$ distribution at a given $T_2$:

$$c_f(T_2) = \frac{1}{1+B(T_2)\dfrac{R(T_2)}{\beta\langle R(T_2)\rangle + R(T_2)}} \quad (3)$$

where $$R(T_2) = \frac{\hat{\phi}(T_2)}{\sigma_\phi(T_2)}.$$

Here $R(T_2)$ corresponds to the SNR for a given $T_2$, $\beta$ is a scalar whose magnitude is typically on the order of unity, and the average <.> is computed over $T_2$.

When the SNR at any relaxation time is large (signifying high confidence in the presence of that $T_2$ component in the data), the correction factor in eqn. (3) is significant and modifies the binned porosity. However, when the SNR at any relaxation time is small (signifying low confidence at that relaxation time), the correction factor tends to one and does not appreciably modify the binned porosity. The use of the SNR in the correction factor may be used for $T_2$ distributions that do not have short relaxation times to avoid amplifying artifacts obtained in the estimated $T_2$ distribution as a result of the non-linear aspects of the inversion algorithm.

Figure 5:
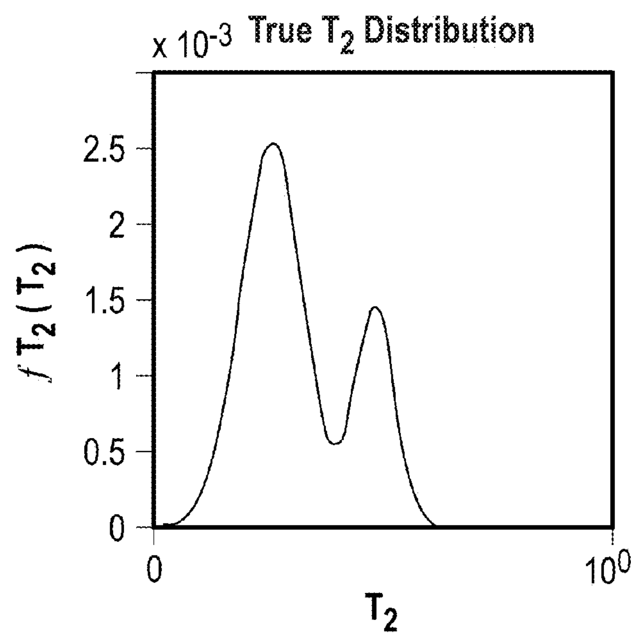
FIG. 5 shows a $T_2$ distribution from which data are simulated in EPM mode, in accordance with the present disclosure.

The use of the corrected $T_2$ distribution is illustrated in FIGS. 5, 6, and 7. FIG. 5 shows the $T_2$ distribution from which data are simulated in EPM mode with a SNR equal to five. Data are calculated with an echo spacing of 200 μs, a main CPMG with 1800 echoes, and a wait time of 2.4 s, and a burst with 10 repetitions, 30 echoes, and a wait time of 20 ms. The true porosity of the $T_2$ distribution is 11 pu. The simulated main and burst data with additive noise and a SNR equal to five are shown in FIG. 6. FIG. 7 shows the estimated $T_2$ distributions produced from the ILT and from applying the correction factor (both obtained using standard inversion parameters and $\alpha$=10, and assuming 30 bins logarithmically spaced between $T_{2,\ min}$=300 μs and $T_{2,\ max}$=3 s for the $T_2$ distribution). It is seen that components of the corrected $T_2$ distribution corresponding to short relaxation times are enhanced to a small degree while the corrected $T_2$ distribution at intermediate relaxation times have undergone almost negligible change. The true and estimated values of porosity, logarithmic mean $T_2$ (T2LM) and bound fluid volume (BFV) from the uncorrected (ILT) and corrected $T_2$ distributions are displayed in FIG. 8. The error bars on the porosity sensitivity curves are obtained from Monte-Carlo analysis performed on data with different noise realizations.

Let the normalized root mean square error (NRMSE) of the porosity be defined as:

$$e = \frac{\sqrt{\langle(\hat{\phi}-\phi_T)^2\rangle}}{\phi_T}\times 100. \quad (4)$$

One hundred different noise realizations of the data were obtained from the $T_2$ distribution in FIG. 5 and analyzed using ILT and the correction factor. The mean and estimated standard deviation of the ILT-derived porosity were 10.1±0.7 pu, resulting in a NRMSE of 10.4% . The mean and estimated standard deviation of the porosity from the corrected distribution were 10.9±0.8 pu, resulting in a lower NRMSE of 7.6% .

If, in addition to the NMR-based porosity obtained from corrected NMR data, one has or obtains a porosity estimate based on dielectric measurements, e.g., from a dielectric permittivity tool, one may use those porosity estimates to estimate a gas volume of the adsorbed gas in the formation. Conceptually, one may consider the NMR-based porosity to represent the total porosity of the formation, while the dielectric permittivity-based porosity represents the water-filled porosity (i.e., the percentage of pore volume filled with water). Assuming the formation holds only adsorbed gas and water in its pores, a common and practical assumption for coal seam gas and coal bed methane formations, the difference between those porosity estimates provides an estimate of the gas volume (i.e., adsorbed gas) in the formation. Specifically, one may subtract the dielectric permittivity-based water-filled porosity from the NMR-based total porosity to obtain an estimate of the gas volume in the formation. One may further determine the gas volume per unit volume of formation using various equations of state. For example, one may use the ideal gas law.

FIG. 9 is a log showing various measured and computed quantities from a first data set. The first track from the left is a depth track. The second track shows the uncorrected T2 distributions (T2_DIST) and the third track shows the corrected T2 distributions (T2LM_DI_NSA). The curves under the MRP_NSA and TCMR headers are the NMR-based porosities, one using the corrected NMR data and the other using the uncorrected NMR data. FIG. 9 shows that at the particular depth of 1155.59 feet, the "uncorrected" porosity (TCMR) is approximately 8.5 pu, while the "corrected" porosity (MRP_NSA) is approximately 9.5 pu. The fifth track in FIG. 9 shows the difference (MRP_diff_NSA) between the corrected porosity and the uncorrected porosity. The sixth track (second from right) shows the T2 logarithmic means for the corrected (T2LM_DI_NSA) and uncorrected (T2LM) T2 distributions, and the seventh track (far right) is a plot of the density (RHOI).

FIG. 10 is a plot of the two NMR signals for that depth as functions of the T2 relaxation times, one uncorrected (ILT) and the other corrected (NSA). It can be seen that just below approximately one millisecond, the uncorrected signal is of lower amplitude than the corrected signal, while the remainder of the curves (i.e., greater than one millisecond) essentially overlay.

FIG. 11 is log showing various measured and computed quantities from a second data set. In particular, it shows a water-filled porosity (far right track–PWXS_ADT.PI) in a coal seam from a dielectric measurement. This is shown merely as an example of obtaining a dielectric permittivity-based water-filled porosity. The first track from the left is a caliper (HCAL) log and gamma ray (GR) log. The second track is a lithology track showing various formation constituents. As described above, if one has a "corrected" NMR-based porosity and a dielectric permittivity-based water-filled porosity, one may compute the adsorbed gas volume by, for example, computing their difference.

A while-drilling or wireline-based data acquisition and analysis operation that can provide a gas volume estimate in a matter of hours after logging the job instead of months may save operators significant time and money. For example, the ability to quickly determine which coal seams are economically worth producing may help operators optimize drilling programs, fracturing (FRAC) campaigns, and completion strategies.

FIG. 12 shows a flowchart illustrating an embodiment in accordance with this disclosure. A NMR apparatus may be disposed in a wellbore and data obtained, or NMR data is otherwise obtained (step 1202). At least some of the NMR data is corrected (step 1204) and a NMR-based porosity is determined using the corrected NMR data (step 1206). Similarly, a dielectric permittivity tool may be disposed in a wellbore and data obtained, or dielectric permittivity data is otherwise obtained (step 1208). A dielectric permittivity-based water-filled porosity is determined (step 1210). An estimate of a gas volume is made using the determined NMR-based estimate of the formation porosity and the determined dielectric permittivity-based estimate of the formation water-filled porosity (step 1212). Optionally, a gas volume per unit volume of the formation may be determined (step 1214).

FIG. 13 is a log showing various measured and computed quantities from a third data set. The first track from the left (Reference) is a depth track, and the second track from the left is a caliper log (HCAL). The third track (T2DIST_DI_CMR) shows the T2 distribution that results from uncorrected NMR processing, while the fourth track (T2DIST_DI_NSA) shows the T2 distribution after correction. Thus, a comparison can be made between the NMR T2 distributions before and after application of the correction. The fifth track shows the total porosity (MRP NSA and MRP CMR) calculated from the corrected and uncorrected T2 distributions, respectively, and the sixth track shows the difference (Delta MRP) between the two porosities (note: 0.05=5 pu). The seventh (far right) track is a basic lithology track showing the sand, shale, and coal in the measured formation.

FIG. 14 is a log showing various measured and computed quantities from a fourth data set. The first track from the left shows a caliper log (HCAL). The second track from the left is a lithology log generated using a spectroscopy tool. The third track from the left shows the neutron (TNPH), density (RHOI), and photoelectric factor (PEF8) logs. The fourth track is the resistivity track (RXO8, RT_HRLT, and RXO_ADT) with the NMR permeability (KTIM) as well. The fifth track (second from the right) shows the dielectric permittivity-based water-filled porosity (PWXO_ADT) and NMR porosity (MRP_NSA). The sixth track (far right) shows the calculated adsorbed gas volume (adgas1.UD) and gas-in-place (GIP_m3_hectare.UD), determined as disclosed herein.

It is to be noted that NMR well-logging tools differ from those commonly used in the medical field in many respects. Obviously the operating environment for a downhole tool is much harsher than the laboratory setting of an imaging facility. In addition, a downhole NMR is configured "inside-out" relative to a typical "closed" medical NMR device. That is, medical devices usually look inward to their targeted area, whereas downhole NMR devices look outward into the surrounding formation.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:

placing an NMR system downhole;

obtaining nuclear magnetic resonance (NMR) data for a subsurface geological formation;

correcting at least a portion of the NMR data to produce corrected NMR data;

determining a NMR-based estimate of formation porosity using the corrected NMR data;

obtaining dielectric permittivity data for the subsurface geological formation;

determining a dielectric permittivity-based estimate of the formation water-filled porosity using the dielectric permittivity data; using the determined estimates for a more efficient drilling or production operation;

in one or more processors, determining a gas volume using the determined NMR-based estimate of the formation porosity and the determined dielectric permittivity-based estimate of the formation water-filled porosity; and using the determined estimates for a more efficient drilling or production operation;

wherein the formation water-filled porosity indicates a percentage of pore volume of the subsurface geological formation filled with water.

2. The method of claim 1, wherein the correcting at least a portion of the NMR data comprises correcting a short transverse relaxation time (T2) portion of the NMR data.

3. The method of claim 2, wherein the correcting at least a short transverse relaxation time (T2) portion of the NMR data comprises weighting the T2 distribution.

4. The method of claim 2, wherein the correcting at least a short transverse relaxation time (T2) portion of the NMR data comprises accounting for the signal-to-noise ratio of the T2 distribution.

5. The method of claim 1, wherein the correcting at least a portion of the NMR data comprises weighting an estimated porosity obtained from inverting the NMR data.

6. The method of claim 1, wherein the determining a gas volume using the determined NMR-based estimate of the formation porosity and the determined dielectric permittivity-based estimate of the formation water-filled porosity comprises subtracting the determined dielectric permittivity-based estimate of the formation water-filled porosity from the determined NMR-based estimate of the formation porosity.

7. The method of claim 1, further comprising making a steering decision for an LWD tool based on the determined gas volume.

8. The method of claim 1, further comprising planning a fracturing operation based on the determined gas volume.

9. The method of claim 1, further comprising planning a well completion based on the determined gas volume.

10. The method of claim 1, further comprising determining an economic viability for a formation based on the determined gas volume.

* * * * *